Oct. 1, 1940.  E. C. BALLMAN  2,216,308

METHOD AND MEANS FOR BALANCING GRINDING WHEELS

Filed Oct. 10, 1938

INVENTOR.
EDWIN C. BALLMAN
BY Bruninga & Sutherland,
ATTORNEYS

Patented Oct. 1, 1940

2,216,308

UNITED STATES PATENT OFFICE 2,216,308

METHOD AND MEANS FOR BALANCING GRINDING WHEELS

Edwin C. Ballman, St. Louis, Mo.

Application October 10, 1938, Serial No. 234,256

4 Claims. (Cl. 74—573)

This invention pertains to a method and means for balancing rotary devices, such as grinding wheels and the like.

In view of the fact that grinding wheels, such as emery wheels, are formed of abrasive material which is usually non-homogeneous, it is practically impossible to balance the grinding wheel itself upon its axis of rotation and at the same time form it to a true circle upon the same axis. Accordingly, grinding wheels as furnished to the trade are usually out of balance, sometimes to a considerable extent.

One of the objects of this invention, therefore, is to provide a simple method for balancing such a device for rotation upon its axis even at a high speed.

Another object is to provide a simple form of balancing weight which may be applied to any type of wheel to balance the same.

Another object is to provide a novel method of indicating on the grinding wheel, or other rotary member, which is the heavy side.

Another object is to provide indicating means for such a rotary member by which a balancing weight may be accurately oriented with respect to the member so as to balance the latter for rotation.

Further objects will appear from the following description taken in connection with the accompanying drawing in which.

Figures 3, 4:
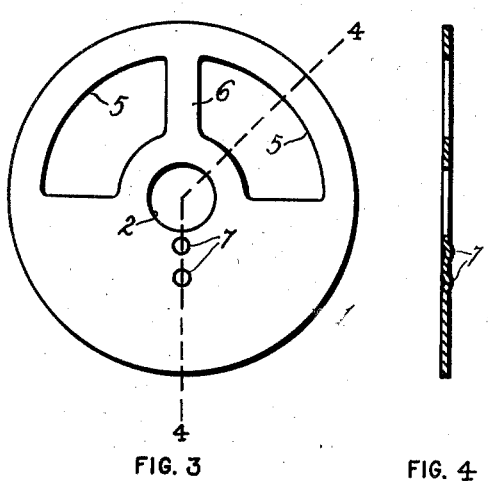
Figure 3 is a face view of a balancing weight embodying this invention.
Figure 4 is a section on line 4—4 of Figure 3.

In accordance with this invention, one or more balancing weights are provided which may be mounted on a rotary member in a simple manner. These balancing weights may be formed as indicated in Figures 3 and 4 in which 1 represents a flat disc of sheet material, such as sheet iron. This is preferably formed of circular form having a central aperture 2 adapted to fit the shaft or spindle 3 of the grinding wheel, or other rotary member 4. The perforation 2 determines the center of rotation of the disc 1. The disc 1 is rendered heavier on one side of its center of rotation than on the other so that it may serve as a balancing weight. This may be accomplished by perforating the disc 1. In Figure 3, perforations 5 are shown of arcuate form and lying entirely on one side of a diameter of the disc. The perforations 5 are preferably located in adjacent quadrants of the disc so as to leave therebetween a sort of spoke 6. The perforations 5 may preferably be located in accurately symmetrical positions with respect to the diameter of the disc extending along the spoke 6 so that said spoke may indicated accurately the light side of the disc with respect to its center of rotation. As it may be desirable occasionally to use a plurality of the discs, one super-imposed one upon the other in stacked relation, said discs may be provided with means for aligning them with each other. Such means are shown in Figures 3 and 4 in the form of deformations 7. These may be formed by indenting one side of the disc so as to form a corresponding projection on the opposite side. These may be accurately located upon all the discs so that when they are stacked one upon the other the projections on the rear of one disc will fit into the indentations on the front of the succeeding disc and thus serve to align the discs with each other so that their spokes 6 will extend in the same direction with respect to the center of rotation.

Figure 5:
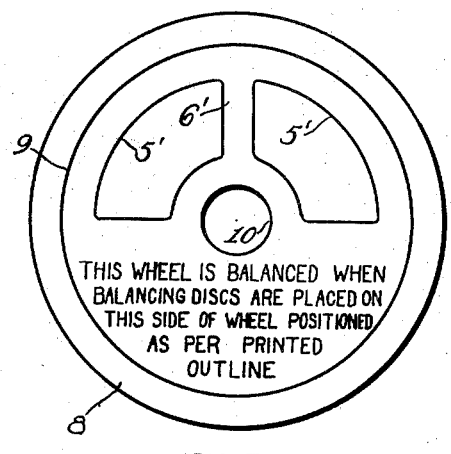
Figure 5 is a face view of a label adapted for attachment to the rotary member to indicate the positioning of the balancing weight.

In accordance with this invention, there may also be provided a label 8 as indicated in Figure 5. This label may have printed or otherwise delineated thereon an outline 9 of the disc 1 and also outlines 5' of the perforations 5 showing therebetween an outline 6' of the spoke 6. The label 8 has a central perforation 10 to receive the shaft 3.

Figure 1:
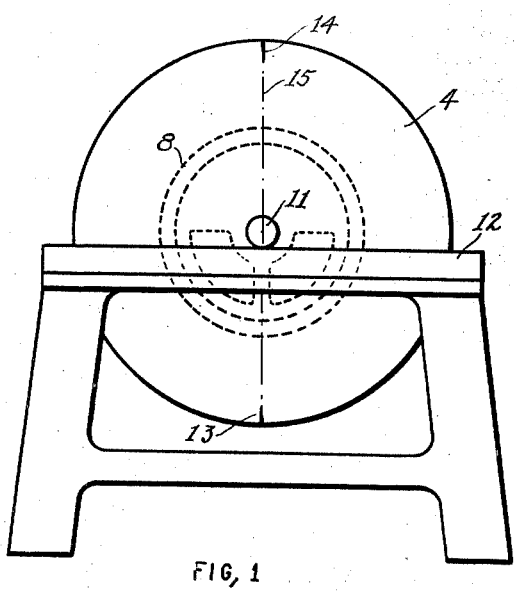
Figure 1 is a view to a reduced scale showing a grinding wheel on balancing ways.

In order to balance the member 4 in accordance with this invention, the same may be placed upon a mandrel 11 and then placed upon suitable balancing ways 12 in the usual manner so as to permit the wheel to assume a position on the ways with its heavy side down. This position is indicated in Figure 1. When this position has been determined, either the heavy side or the light side of the member 4 may be marked as indicated at 13 or 14, respectively. Or a diametrical line may be drawn between these points on the member 4 as indicated at 15. Any other suitable method of marking or indicating the heavy or light side of the wheel 4 may, of course, be employed. When the heavy side of the wheel has been determined, the label 8 is attached to the wheel by pasting or otherwise. The label is positioned on the wheel with its perforation 10 aligned with the bore of the wheel 4 and the spoke 6' accurately positioned in alignment with the line 15, or the marks 13 or 14. This positions the label 8 so that the pattern of the disc 1 drawn thereon is oriented in such a manner as to show the proper position of the balancing disc 1 with relation to the wheel 4 so that the heavy side of the disc will be positioned in opposition to the heavy side of the wheel.

A label 8 may be placed on one face of the wheel 4 or similar labels may be placed on both faces and similarly oriented. Any other suitable manner of outlining the proper position of the balancing disc 1 may, of course, be used. For instance, the outline 5' 6', or any other identifying configuration may be stenciled upon the wheel, thereby providing thereon a label adapted to indicate the proper position of the balancing weight.

Once the label 8 has been properly attached to the wheel 4, one or more discs 1 may be assembled with the wheel 4 and placed upon the label 8 in the proper orientation, as indicated by the pattern printed thereon. The weights will then be in proper position to balance the wheel since the heavy portions are positioned oppositely to the heavy part of the wheel. Any number of discs may be employed to build up the proper weight for balancing. The discs may be provided in different thicknesses, as for instance by forming of different gauges of sheet metal, and any combination of different thicknesses may be employed to build up the necessary weight.

Figure 2:
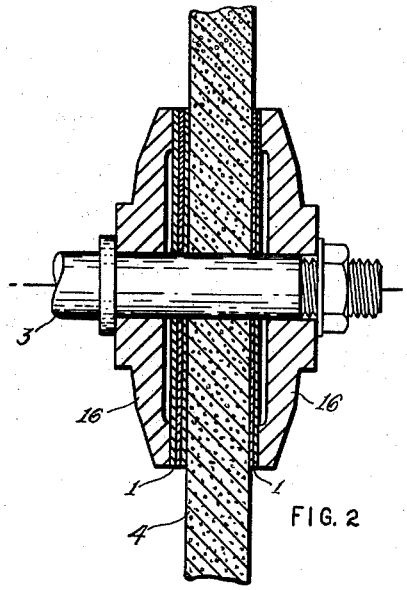
Figure 2 is an enlarged fragmentary sectional view of a grinding wheel assembly having balancing means embodying this invention.

Ordinarily an operator engaged in balancing such wheels soon learns to tell by the rapidity with which the wheel turns on the ways 12 approximately how much weight is required to balance the same and can therefore estimate the number of discs required. These may then be assembled with the wheel 4 on one or both sides thereof, as indicated in Figure 2, and then clamped in position under the flanges 16. The assembled device may then be mounted in any suitable bearings upon its own shaft 3 and rotated at the desired speed to determine the accuracy of the balance, and if such test indicates the need of more or less weight, the adjudgment can be made by adding or removing one or more of the discs 1. In this manner an accurate balance of the assembled device for rotation may be accomplished.

It will be seen, therefore, that this invention provides balancing means of a very simple structure and a method of balancing which is simple and accurate. The heavy side of the wheel may be accurately determined and then the side permanently marked by the addition of the label 8 so that it will not be necessary at any subsequent time to repeat this determination. This determination may be made at the factory and label 8 attached so that the wheels may be furnished to the trade with the labels 8. Balancing weights, such as 1, may be provided separately and may be assembled with the wheel at any subsequent time and with the assurance that the label will provide means for accurately orienting the same.

While this invention has been described as embodied in a unitary device, it will be understood that various individual features or sub-combinations thereof may be employed and found useful by themselves without reference to other features or the complete combination. Accordingly, it is to be understood that the employment of such individual features or sub-combinations is contemplated by this invention and within the scope of the appended claims. It is further obvious that various changes may be made in the details of construction or procedure within the scope of the appended claims without departing from the spirit of this invention. It is understood, therefore, that the invention is not limited to the specific details shown or described.

Having thus described the invention, what is claimed is:

1. The method of balancing rotary members of the character described, comprising, providing one or more balancing elements of a pre-determined form, determining the heavy side of the member, permanently attaching to the member a label patterned to correspond with the form of said element, and assembling on the member one or more of said elements in registry with the pattern of said label, said label being oriented on the member with respect to the heavy side thereof so as, by such registry, to position said elements with their heavy sides in opposition to that of the member in order to balance the same.

2. The method of balancing rotary members of the character described, comprising, providing one or more sheet metal balancing elements of a pre-determined form, determining the heavy side of the member, permanently attaching to the member a label patterned to correspond with the form of said element, and assembling on the member one or more of said elements by clamping the same to the side of the member in registry with the pattern of said label, said label being oriented on the member with respect to the heavy side thereof so as, by such registry, to position said elements with their heavy sides in opposition to that of the member in order to balance the same.

3. A rotary device of the character described, comprising, a wheel member having a shaft, a label attached to said member, having a pattern oriented to indicate the heavy side of said member, and one or more balancing discs having a similar pattern and formed heavier on one side of their centers of rotation than the other assembled on said wheel member in registry with said label pattern so as to position their heavy sides in opposition to that of said member, whereby the assembled device is balanced for rotation.

4. In combination with a rotary member of the character described, a balancing weight in the form of a thin disc heavier on one side of its center of rotation than the other, and a label attached to the member having a pattern similar to that of said weight positioned to indicate the proper orientation of said weight to balance the member for rotation.

EDWIN C. BALLMAN.